United States Patent [19]

Hwang

[11] Patent Number: 6,029,970
[45] Date of Patent: Feb. 29, 2000

[54] AUTOMATIC PAPER FEEDING DEVICE IN A MULTIFUNCTIONAL MACHINE

[75] Inventor: Seung-Taik Hwang, Seoul, Rep. of Korea

[73] Assignee: SamSung Electronics Co., Ltd., Suwon, Rep. of Korea

[21] Appl. No.: 09/076,891

[22] Filed: May 13, 1998

[30] Foreign Application Priority Data

May 13, 1997 [KR] Rep. of Korea ............... 97/18585

[51] Int. Cl.[7] ............... B65H 3/44; H04N 1/04; G03G 15/00
[52] U.S. Cl. ............... 271/9.08; 271/9.11; 271/9.13; 271/124; 271/127; 271/162; 358/498; 399/363
[58] Field of Search ............... 271/9.01, 9.07, 271/9.08, 9.11, 9.13, 121, 124 C, 127 C, 162 C, 124, 127, 162; 358/498 C, 498; 399/363 C, 365, 367, 397; 400/605, 624

[56] References Cited

U.S. PATENT DOCUMENTS

| | | |
|---|---|---|
| 4,861,012 | 8/1989 | Shimizu . |
| 4,879,578 | 11/1989 | Hisajima et al. ............... 355/234 |
| 4,898,488 | 2/1990 | Yokoi et al. . |
| 4,975,749 | 12/1990 | Tsunoda et al. . |
| 4,995,745 | 2/1991 | Yokoi et al. . |
| 5,057,874 | 10/1991 | Miyazaki et al. . |
| 5,102,112 | 4/1992 | Takahashi . |
| 5,171,006 | 12/1992 | Naito . |
| 5,226,639 | 7/1993 | Kida et al. . |
| 5,259,607 | 11/1993 | Hironori et al. . |
| 5,291,224 | 3/1994 | Asano et al. . |
| 5,391,009 | 2/1995 | Stodder ............... 400/605 |
| 5,419,543 | 5/1995 | Nakamura et al. ............... 271/9 X |
| 5,450,188 | 9/1995 | Isobe . |
| 5,454,555 | 10/1995 | Kiyohara et al. ............... 271/9 X |
| 5,485,990 | 1/1996 | Kato . |
| 5,550,652 | 8/1996 | Park . |
| 5,582,399 | 12/1996 | Sugiura . |
| 5,651,623 | 7/1997 | Stodder et al. . |
| 6,833,381 | 11/1998 | Kellogg et al. ............... 400/624 |

FOREIGN PATENT DOCUMENTS 2203414A 4/1987 United Kingdom ............... 271/9.13

*Primary Examiner*—Christopher P. Ellis
*Assistant Examiner*—Kenneth W. Bower
*Attorney, Agent, or Firm*—Robert E. Bushnell, Esq.

[57] ABSTRACT

An automatic paper feeding device in a multifunction machine including a recording medium cassette, a document cassette and a paper feeding unit. The document cassette is separated rotatably from the feeding unit. When performing either a printing or a copying function in the multifunctional machine, an automatic document feeding (ADF) rubber of the document cassette is separated from an automatic document feeding (ADF) roller of the paper feeding unit. When performing a fax function in the multifunctional machine, the ADF rubber of the document cassette is contacted to the ADF roller of the paper feeding unit.

15 Claims, 4 Drawing Sheets

AUTOMATIC PAPER FEEDING DEVICE IN A MULTIFUNCTIONAL MACHINE

CLAIM FOR PRIORITY

This application makes reference to, incorporates the same herein, and claims all benefits accruing under 35 U.S.C. § 119 from an application for AUTOMATIC PAPER FEEDING DEVICE IN A MULTIFUNCTIONAL MACHINE earlier filed in the Korean Industrial Property Office on the 13$^{rd}$ of May 1997, and there duly assigned Ser. No. 18585/1997, a copy of which application is annexed hereto.

BACKGROUND OF THE INVENTION

1. Technical Field

The present invention relates to an automatic paper feeding device in a multifunctional machine, and more particularly to an automatic paper feeding device in a multifunctional machine integrating functions of a printer, a scanner and a facsimile capable of reducing an abrasion of an automatic document feeding rubber so that an automatic document feeding roller and the automatic document feeding rubber cannot be contacted each other when a recordable medium is automatically fed.

2. Related Art

A multi-functional machine is manufactured to perform functions of a printer, a scanner and a facsimile system. An automatic paper feeding device is used to feed a recording medium or a copying paper into the multi-functional machine when performing a function of the printer, and to feed a document when performing functions of the scanner and the facsimile system. Examples of contemporary paper or document feeding devices are disclosed in U.S. Pat. No. 4,861,012 for Paper Feeder For Image Forming Apparatus issued to Shimizu, U.S. Pat. No. 4,898,488 for Printer With Multi-Function Paper Feeding Mechanism issued to Yokoi et al., U.S. Pat. No. 4,975,749 for Automatic Paper Feeder issued to Tsunoda et al., U.S. Pat. No. 4,995,745 for Printer With Multi-Function Paper Feeding Mechanism issued to Yokoi et al., U.S. Pat. No. 5,057,874 for Paper Conveying Apparatus issued to Miyazaki et al., U.S. Pat. No. 5,102,112 for Paper Feeding Device For Image Forming Equipment issued to Takahashi, U.S. Pat. No. 5,171,006 for Sheet Material Feeding Device issued to Naito, U.S. Pat. No. 5,226,639 for Paper Feeding Device For Facsimile Apparatus issued to Kida et al., U.S. Pat. No. 5,259,607 for Automatic Paper Feeding Device issued to Hironori et al., U.S. Pat. No. 5,291,224 for Sheet Feeding Apparatus Using Pair Of Spur Rollers issued to Asano et al., U.S. Pat. No. 5,391,009 for Single Motor Actuation For Automatic Stack Feeder System In A Hardcopy Device issued to Stodder, U.S. Pat. No. 5,485,990 for Image Forming Apparatus issued to Kato, U.S. Pat. No. 5,419,543 for Paper Feeding Apparatus For Printer issued to Nakamura et al., U.S. Pat. No. 5,550,652 for Automatic Document Feeder For A Facsimile Machine issued to Park, U.S. Pat. No. 5,582,399 for Sheet Feeding Device Having Sheet Edge Sensor issued to Sugiura, and U.S. Pat. No. 5,651,623 for Multiple-Function Printer With Common Feeder/Output Path Mechanisms And Method Of Operation issued to Stodder et al. Many of these feeding devices are complex which require increased production cost and time necessary to pass the paper through the multi-functional machine.

Moreover, a significant problem that frequently occurs in such a multi-functional machine is paper jam in the automatic paper feeding device. Paper jam occurs mainly due to the abrasion of an automatic document feeding (ADF) rubber which is in direct contact with an ADF roller of the automatic paper feeding device during a copying or printing operation of the multi-functional machine. When the ADF rubber is severely worn out, the friction force of the ADF rubber which enables the document to be fed into the multi-functional machine is diminished. As a result, a paper jam frequently occurs or the document is not fed. When the ADF rubber is worn out, the ADF rubber must be exchanged periodically, which can be extremely inconvenient for users. Accordingly, it is desirable to prevent or minimize the abrasion between the ADF rubber and the ADF roller during copying and printing operations.

SUMMARY OF THE INVENTION

Accordingly, it is therefore an object of the present invention to provide an automatic paper feeding device for use in a multi-functional machine integrating functions of a printer, a scanner, and a facsimile system.

It is also an object to provide an automatic paper feeding device for use in a multi-functional machine which is designed to minimize abrasion of an automatic document feeding (ADF) rubber during copying and printing operations.

It is further an object to provide an automatic paper feeding device for use in a multi-functional machine which is designed to separate an automatic document feeding (ADF) roller and an automatic document feeding (ADF) rubber during copying and printing operations while maintaining the ADF roller in contact with the ADF rubber during a fax operation.

These and other objects of the present invention can be achieved by an automatic paper feeding device in a multi-functional machine which comprises a recording medium cassette, a document cassette and a paper feeding unit. The document cassette is separated rotatably from the paper feeding unit. When performing either a copying function or a printing function in the multifunctional machine, the automatic document feeding (ADF) rubber of the document cassette is separated from the automatic document feeding (ADF) roller of the paper feeding unit. When performing a fax function in the multifunctional machine, the ADF rubber of the document cassette is contacted to the ADF roller of the paper feeding unit.

According to another aspect of the present invention, the paper feeding unit includes a pickup roller for transporting a recording medium to a pair of transporting rollers one by one; an automatic document feeding (ADF) roller which is attached to the pickup roller and transports the document to the transporting rollers one by one; a cover for supporting and covering an assembly of the pickup roller and ADF roller; a document cassette which is rotatably connected at one side of the cover neighboring the ADF roller with a hinge; an ADF rubber which is contacted to the ADF roller by an elastic element such as a compressed coil spring located on one end of the document cassette with a predetermined pressure; and an automatic document feeding (ADF) roller/rubber contacting unit for separating the ADF roller and ADF rubber when performing the first function and contacting the ADF roller and ADF rubber when performing the second function.

Preferably, the ADF roller/rubber contacting unit includes a first locking unit which is fixed at the paper feeding unit; and a second locking unit which is fixed at the document cassette corresponding to the first locking unit. Preferably, the first and second locking units each has a shape of hook, and one of the first and second locking units is an elastic body. Preferably, the first function is a copying or printing operation, and the second function is a fax operation.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
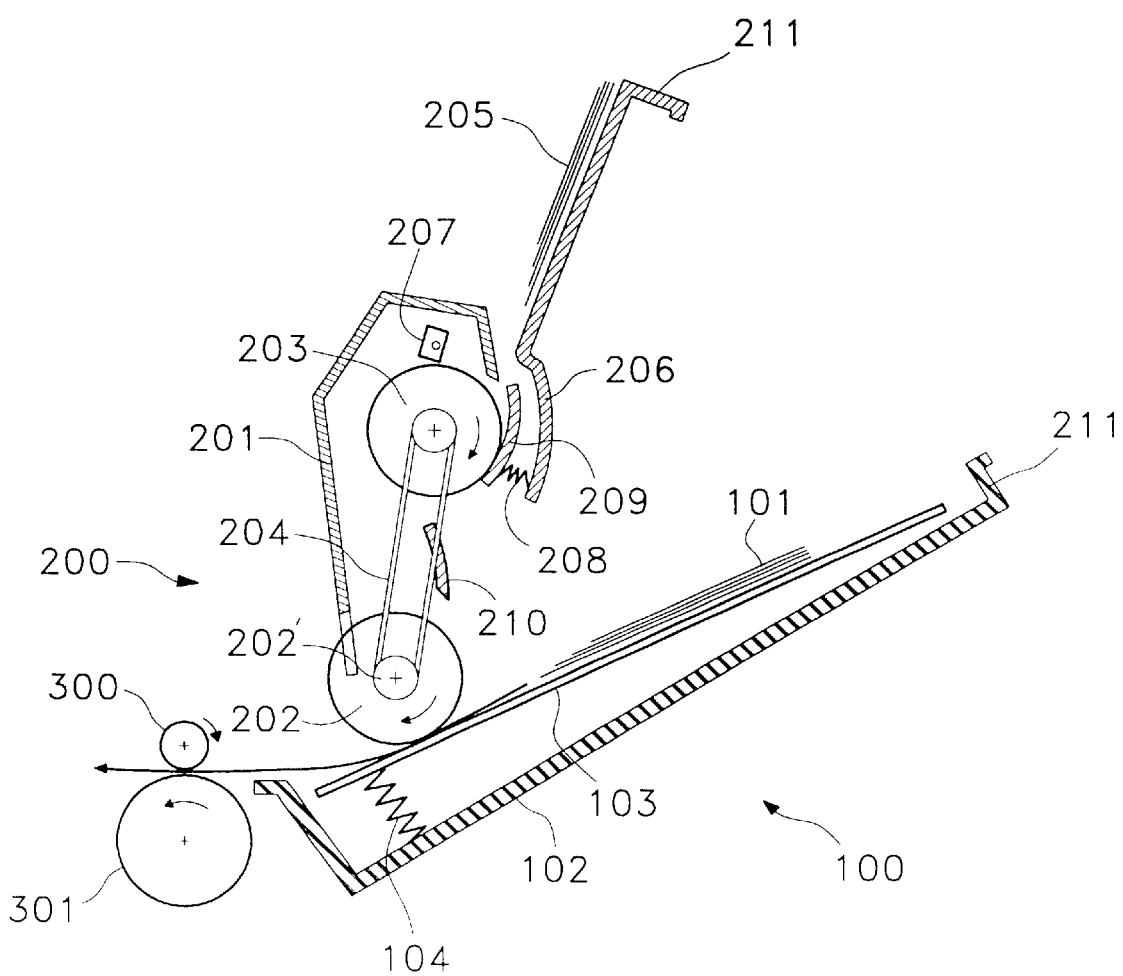
FIG. 1 is a sectional view illustrating a recording medium feeding state in a multi-functional machine.

Referring now to the drawings and particularly to FIG. 1, which illustrates an exemplary automatic paper feeding device for use in a multifunctional machine. The automatic paper feeding device includes a recording medium cassette 100 that is attached/detached to a main body (not illustrated) of the multifunctional machine and a plurality of recording media 101 are collected in the recording medium cassette 100. At the upper part of the inner side of the main body facing the recording medium cassette 100, a paper feeding unit 200 is mounted for feeding each recording medium 101 from the recording medium cassette 100 or each page of a document 205 which is guided in a separate path. A pair of transporting rollers 300 and 301 is positioned in proximity of the recording medium cassette 100 for transporting the recording medium 101 or the document 205 to the inside of the main body of the multifunctional machine.

The recording medium cassette 100 includes a recording medium case 102; a recording medium feeding plate 103 in which a plurality of recording media 101 are stacked; and a compressed coil spring 104 which is an elastic element to be located between the recording medium case 102 and a recording medium feeding plate 103 and elastically supports the recording medium feeding plate 103.

The paper feeding unit 200 includes a pickup roller 202 for transporting the recording medium 101 one by one to the inside of the main body of the multifunctional machine; an automatic document feeding (ADF) roller 203 which is connected to the pickup roller 202 through a power convey unit such as an idle gear or a timing belt 204 and transports the document 205 one by one to the inside of the main body; a cover 201 for supporting and covering an assembly of the pickup roller 202 and the ADF roller 203; a document cassette 206 which is integrally fixed at one side of the cover 201 neighboring ADF roller 203 and guides the transportation of the document 205; and an automatic document feeding (ADF) rubber 209 which is contacted to the ADF roller 203 with a predetermined pressure by a compressed coil spring 208 which is an elastic element to be located on one end of the document cassette 206

The cover 201 is rotatably located on a rotary shaft 202' of the pickup roller 202. One of the ADF roller 203 and the pickup roller 202 is connected to a motor (not shown), and power is conveyed to the ADF roller 203 and the pickup roller 202 through the timing belt 204. Here, the recording medium 101 is a blank sheet of paper for recording predetermined data when the multifunctional machine performs a function of the copier or printer, and the document 205 is a sheet containing data to be transmitted when the multifunctional machine performs a function of the facsimile system. Reference numerals 210 and 211 are a document guide and a locking unit for locking/unlocking the document cassette 206 to the recording medium cassette 100 when the document 205 is automatically fed. In addition, 207 is a document sensor for sensing the document 205 located on the document cassette 206.

The operation of the automatic paper feeding device in the multifunctional machine will now be described in detail with reference to FIGS. I and 2 herein below.

FIG. 1 illustrates a sectional view of a recording medium feeding state of the automatic paper feeding device. In order to perform function of printing or copying in the multifunctional machine, when a cassette locking unit 211 which locks the document cassette 206 and the recording medium cassette 100 is released and the cover 201 is raised based on the rotary shaft 202' of the pickup roller 202, the recording medium feeding plate 103 of the recording medium cassette 100 is raised upward by the elasticity of the compressed coil spring 104 which is the elastic element. Accordingly, the recording medium 101 which is located on the recording medium feeding plate 103 is contacted to the pickup roller 202. At this time, since the recording medium feeding plate 103 is supported elastically by the compressed coil spring 104 which is the elastic element, the recording medium 101 is pressed by the pickup roller 202 and the recording medium feeding plate 103 and inserted between them.

After that, when the motor is driven, the pickup roller 202 connected to the motor is rotated and the ADF roller 203 which is connected to the pickup roller 202 by the timing belt 204 is rotated in the same direction as the pickup roller 202. As the pickup roller 202 is rotated, the recording medium 101 which is located on the recording medium feeding plate 103 by the frictional operation against the pickup roller 202 is transported to the transporting rollers 300 and 301 one by one, and then transported to the inside of the main body of the multifunctional machine through the transporting rollers 300 and 301.

Here, since the document 205 is not stacked in the document cassette 206, the document 205 is not fed from the document cassette 206 even if the pickup roller 202 and the ADF roller 203 are rotated by means of the timing belt 204. The ADF roller 203 is continuously rotated until the copying or printing operation is completed with being contacted to the ADF rubber 209 of the document cassette 206.

Figure 2:
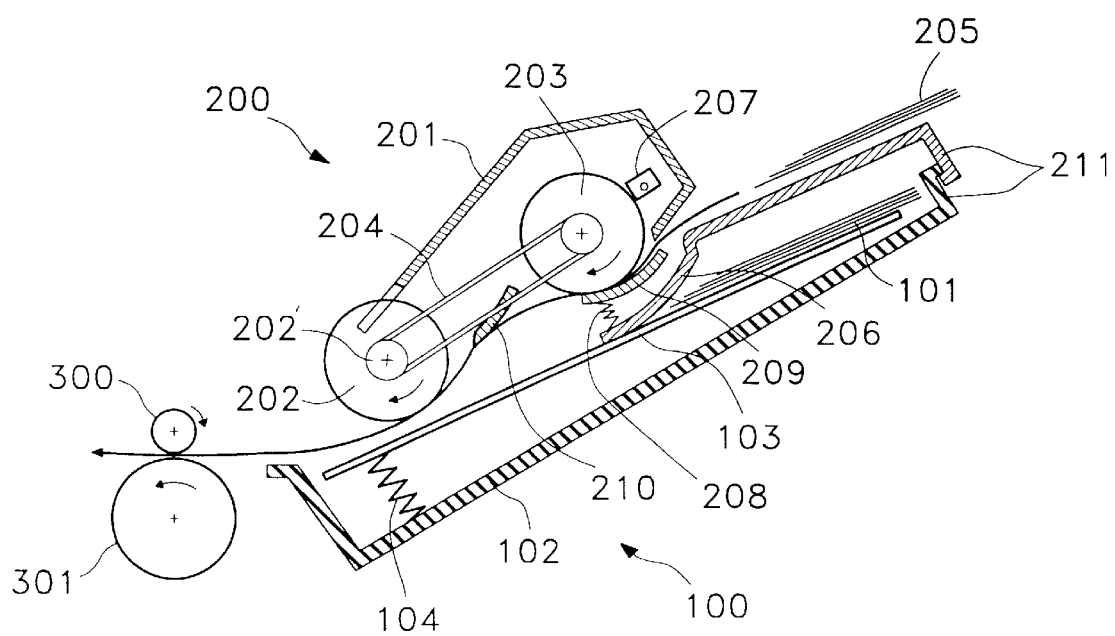
FIG. 2 is a sectional view illustrating a document feeding state in the multi-functional machine of FIG. 1.

FIG. 2 illustrates a sectional view of a document feeding state of the automatic feeding device. When the cover 201 is rotated based on the rotary shaft 202' and then lowered downward, the document cassette 206 and the recording medium cassette 100 are mutually locked by the cassette locking unit 211. Accordingly, the document cassette 206 is contacted to the recording medium 101 of the recording medium cassette 100 and presses the recording medium feeding plate 103. At this time, the top end of the document cassette 206 which is connected to the ADF rubber 209 by means of the spring 208 is lowered downward and located at a position lower than the pickup roller 202 maintaining a surface level. Accordingly, when the document cassette 206 and the recording medium cassette 100 are mutually locked by the cassette locking unit 211 maintaining a surface level, the top end of the document cassette 206 presses the recording medium feeding plate 103 and the pickup roller 202 is apart from the recording medium 101 located on the recording medium feeding plate 103.

Under the document feeding state, when a plurality of documents 205 are stacked in the document cassette 206 so that each document can be inserted between the ADF roller 203 and the ADF rubber 209, the document sensor 207 senses the document 205 and the motor is controlled by a control unit (not shown). For example, in the case that the rotary shaft 202' of the pickup roller 202 is attached to the motor, the ADF roller 203 is rotated in the same direction by means of the timing belt 204.

When the ADF roller 203 is rotated, the document 205 located on the document cassette 206 passes through the pickup roller 202 one by one along the document guide 210 by the frictional operation against the ADF rubber 209. The document 205 which passed through the pickup roller 202 is transported to the transporting rollers 300 and 301 and then transported to the inside of the main body by the reciprocal action of the transporting rollers 300 and 301.

When the document is automatically fed into the multi-functional machine using the fax function by the automatic paper feeding device as shown in FIGS. 1 and 2, the ADF roller is contacted to the ADF rubber and rotated with locating the document between the ADF roller and the ADF rubber. In this case, the abrasion of the ADF rubber cannot be avoided. In addition, when the recording medium from the cassette 100 is automatically fed using function of copying or printing in the multifunctional machine, the ADF roller is rotated in direct contact with the ADF rubber, the ADF rubber can be abraded severely.

When the ADF rubber is severely worn out, and the friction force of the ADF rubber which enables the document to be fed is diminished, the border surface of the document and the ADF rubber becomes slippery. As a result, a paper jam frequently occurs or the document fails to be fed into the main body of the functional machine. In addition, when the ADF rubber is worn out, the ADF rubber must be exchanged periodically in order to avoid paper jam. The exchange of the ADF rubber can be extremely inconvenient for the user to manage and use the multifunctional machine.

Figure 3:
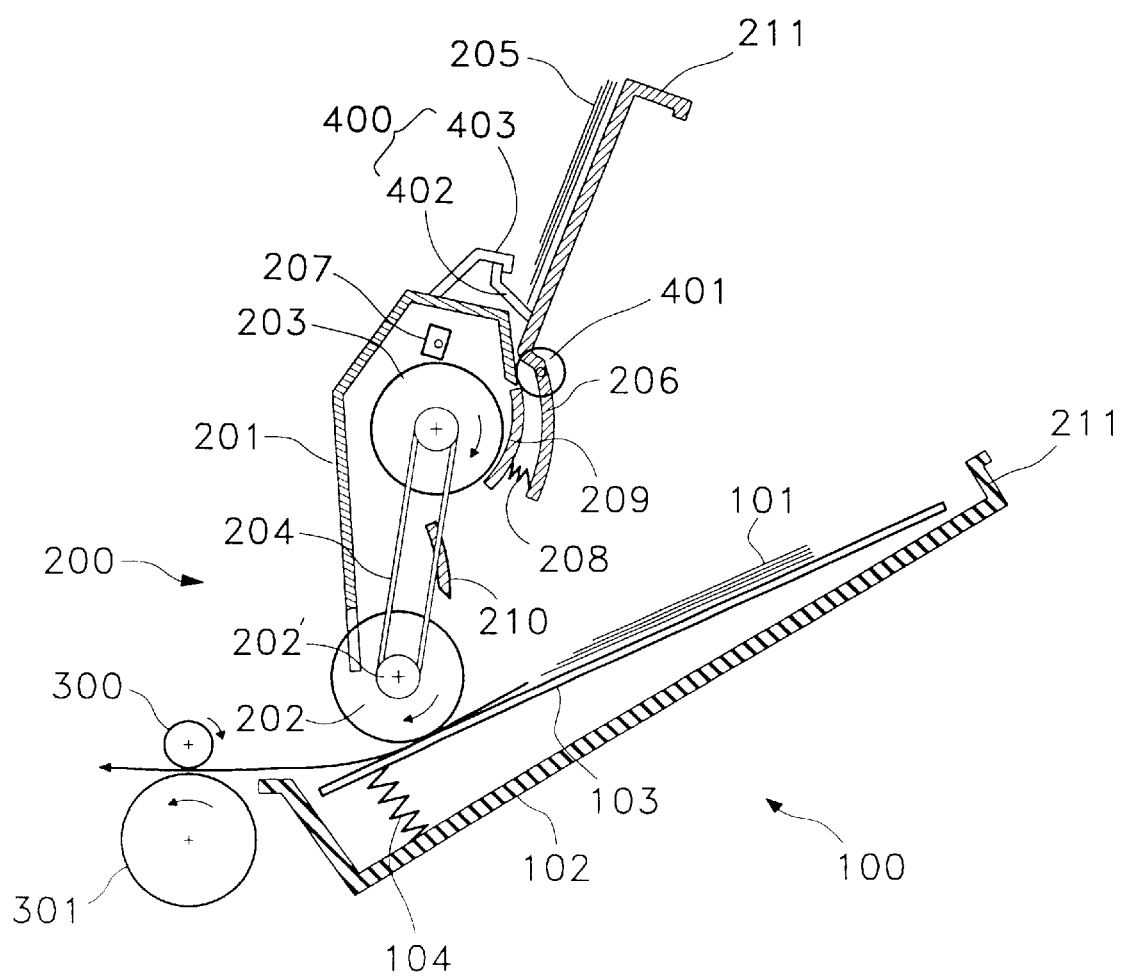
FIG. 3 is a sectional view illustrating a recording medium feeding state in an automatic paper feeding device of a multi-functional machine according to the principles of the present invention.

Turning now to FIG. 3, which illustrates an automatic paper feeding device for use in a multi-functional machine which is designed to minimize abrasion of an automatic document feeding (ADF) rubber during copying and printing operations according to the principles of the present invention. The automatic paper feeding device includes a recording medium cassette 100 which is attached/detached to a main body (not illustrated) of a multifunctional machine, and a plurality of recording media 101 which are collected in the recording medium cassette 100. At the upper part of the inner side of the main body facing the recording medium cassette 100, a paper feeding unit 200 is mounted for feeding the recording medium 101 of the recording medium cassette 100 or a document 205 which is guided in a separate path. A pair of transporting rollers 300 and 301 is positioned in proximity to the recording medium cassette 100 for transporting the recording medium 101 or the document 205 to the inside of the main body of the multi-functional machine.

The recording medium cassette 100 includes a recording medium case 102 having a collection area; a recording medium feeding plate 103 in which a plurality of recording media 101 are stacked; and a compressed coil spring 104 which an elastic element to be located between the recording medium case 102 and the recording medium feeding plate 103 and elastically supports the recording medium feeding plate 103.

According to one embodiment of the present invention, the paper feeding unit 200 includes a pickup roller 202 for transporting the recording medium 101 one by one to the inside of the main body; an automatic document feeding (ADF) roller 203 which is connected to the pickup roller 202 through a timing belt 204 such as an idle gear or a timing belt and transports the document 205 one by one to the inside of the main body; a cover 201 for supporting and covering an assembly of the pickup roller 202 and the ADF roller 203; a document cassette 206 which is rotatably connected at one side of the cover 201 neighboring the ADF roller 203 with a pivot 401; an ADF rubber 209 which is contacted to the ADF roller 203 by a compressed coil spring 208 which is an elastic element to be located at one end of the document cassette 206 with a predetermined pressure; and an automatic document feeding (ADF) roller/rubber contacting unit 400 for separating the ADF roller 203 and ADF rubber 209 when performing either a copying or printing function and contacting the ADF roller 203 and ADF rubber 209 when performing a fax function. The document cassette 206 is made of a single rigid unit, which is connected at one side of the cover 201 neighboring the ADF roller 203 by means of a pivot 401 and is rotated in either a clockwise or a counterclockwise direction.

The ADF roller/rubber contacting unit 400 includes a first locking unit 403 fixed at the cover 201; and a second locking unit 402 fixed at the document cassette 206 corresponding to the first locking unit 403. As the document cassette 206 is rotated in either a clockwise direction or a counterclockwise direction by means of a pivot 401, the first and second locking units 403 and 402 are disconnected or connected. Here, the second locking unit 402 is located at so as not to disturb the transportation of the document 205.

The first and second locking units 403 and 402 are made in a pair and perform a locking/unlocking operation. Various structures of the first and second locking units 403 and 402 can be formed. For example, by forming each of the first and second locking units 403 and 402 in a hook shape and manufacturing the first locking unit 403 with an elastic body, when the second locking unit 402 is connected to the first locking unit 403, the first locking unit 403 is changed elastically, and thereby they are locked or unlocked.

As described above, in the case that the multifunctional machine performs a first function such as copying or printing operation, the ADF roller/rubber contacting unit 400 separates the ADF roller 203 from the ADF rubber 209. On the contrary, in the case of performing a second function such as a fax operation, the ADF roller/rubber contacting unit 400 contacts the ADF roller 203 to the ADF rubber 209.

Figure 4:
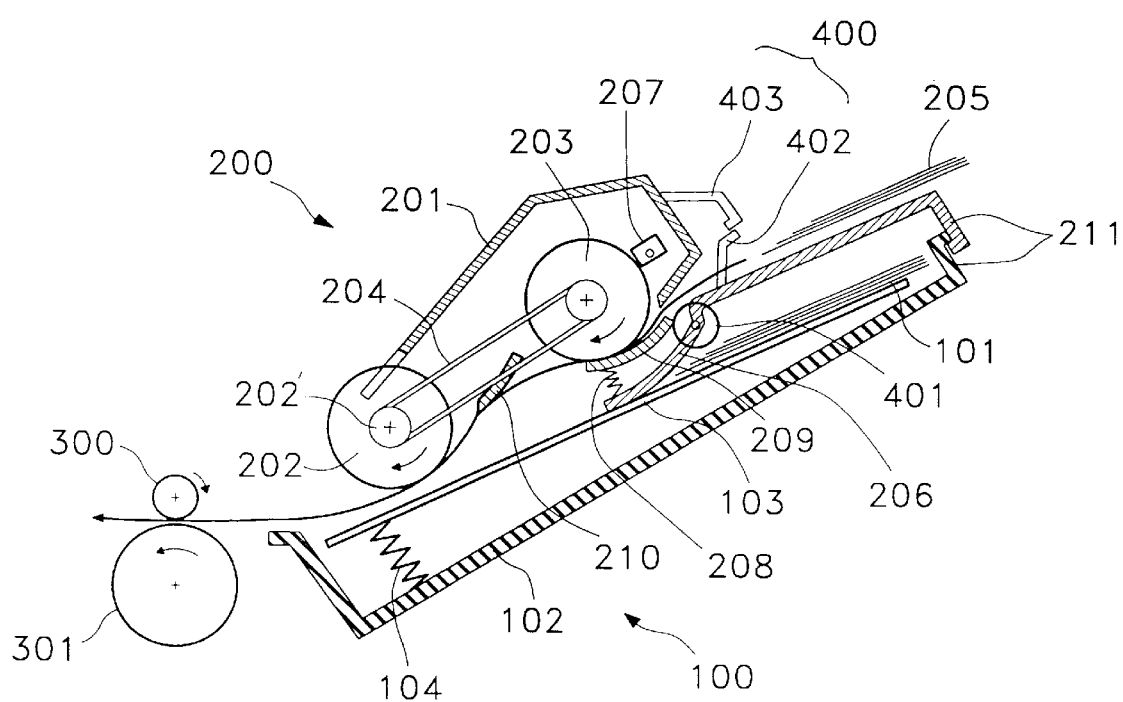
FIG. 4 is a sectional view illustrating a document feeding state in the automatic paper feeding device of the multi-functional machine according to the principles of the present invention.

Now, the operation of the automatic paper feeding device in the multifunctional machine according to the present invention will be described in detail with reference to FIG. 3 which is a sectional view of a recording medium feeding state, and FIG. 4 which is a sectional view of a document feeding state in the automatic paper feeding device of the multifunctional machine.

As shown in FIG. 3, in the case of performing the copying or printing function of the multifunctional machine, when a cassette locking unit 211 which locks the document cassette 206 and the recording medium cassette 100 is released and the cover 201 is raised based on the rotary shaft 202' of the pickup roller 202, the recording medium feeding plate 103 of the recording medium cassette 100 is raised upward by the elasticity of the compressed coil spring 104 which is the elastic element. Accordingly, the recording medium 101 located on the recording medium feeding plate 103 is contacted to the pickup roller 202. Since the recording medium feeding plate 103 is elastically supported by the compressed coil spring 104 which is the elastic element, the recording medium 101 is pressed by the pickup roller 202 and the recording medium feeding plate 103 and inserted between them.

When the document cassette 206 is rotated by a predetermined angle counterclockwise based on the hinge 401, as shown in FIG. 3, locking units 402 and 403 of hook shape are mutually locked. As a result, the ADF rubber 209 of the document cassette 206 is apart from the ADF roller 203 by a predetermined distance.

After that, when the motor is driven, the pickup roller 202 connected to the motor is rotated and the ADF roller 203 connected to the pickup roller 202 through the timing belt 204 is rotated in the same direction. As the pickup roller 202 is rotated, the recording medium 101 located on the feeding plate 103 by the frictional operation against the pickup roller 202 is transported toward the transporting rollers 300 and 301 one by one. The recording medium 101 passes through the transporting rollers 300 and 301 and then is transported to the inside of the main body.

At this time, since the document 205 is not stacked in the document cassette 206, the document 205 is not fed from the document cassette 206 even though the pickup roller 202 and the ADF roller 203 are rotated by means of the timing belt 204. The ADF roller 203 is rotated continuously without being in contact with the ADF rubber 209 of the document cassette 206 until the copying or printing operation is completed.

In addition, since the ADF roller 203 is rotated without being in contact with the ADF rubber 209, the ADF rubber 209 is not abraded at all. Accordingly, since the life span of the ADF rubber 209 is lengthened and it is unnecessary to exchange the ADF rubber 209 periodically.

On the other hand, in the case of using the fax operation of the multi functional machine, when the document cassette 206 is rotated in a clockwise direction by means of a pivot 401, the second locking unit 402 of the document cassette 206 is forcedly released from the first locking unit 403.

When the cover 201 is rotated based on the rotary shaft 202' of the pickup roller 202 and then lowered downward, the document cassette 206 and the recording medium cassette 100 are mutually locked by the cassette locking unit 211. Accordingly, the document cassette 206 is contacted with the recording medium 101 of the recording medium cassette 100 and presses the recording medium feeding plate 103. At this time, the top end of the document cassette 206 which is connected to the ADF rubber 209 by means of the spring 208 is lowered downward and is located at a position lower than the pickup roller 202 for maintaining a surface level. Accordingly, when the document cassette 206 and the recording medium cassette 100 are mutually locked by the cassette locking unit 211 maintaining a surface level, the top end of the document cassette 206 presses the recording medium feeding plate 103 and the pickup roller 202 is apart from the recording medium 101 located on the recording medium feeding plate 103. Moreover, the ADF rubber 209 is raised upward by the spring 208 and contacted with the ADF roller 209.

When a stack of documents 205 are contained in the document cassette 206 so that each document can be inserted between the ADF roller 203 and the ADF rubber 209, a document sensor 207 senses the input of each document 205 and the motor is controlled by a control unit (not shown).

For example, in the case that the rotary shaft 202' of the pickup roller 202 is connected to the motor, the ADF roller 203 is rotated in the same direction by means of the timing belt 204.

When the ADF roller 203 is rotated, the document 205 located on the document cassette 206 passes through the pickup roller 202 one by one along a document guide 210 by the frictional operation against the ADF rubber 209. The document 205 which passed through the pickup roller 202 is transported to the transporting rollers 300 and 301 and then transported to the inside of the main body by the reciprocal action of the transporting rollers 300 and 301.

As described above, in the case that the recording medium within the recording medium cassette is automatically fed in order to perform the copying or printing operation of the multifunctional machine, the ADF roller and the ADF rubber which are used for feeding the document are not contacted each other, thereby reducing unnecessary abrasion of the ADF rubber. In addition, as the abrasion of the ADF rubber is noticeably reduced, the feeding performance is enhanced, and thereby the paper jam is prevented. Moreover, as the abrasion of the ADF rubber is noticeably reduced, the life span of the ADF rubber is lengthened, and thereby users can easily use the multifunctional machine and the managing cost is reduced.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An automatic paper feeding device in a multifunctional machine, comprising:
   a first cassette attachable to a main body of the multifunctional machine, retentively accommodating a recording medium;
   a paper feeding unit rotatable connected to said main body, including:
      a second cassette accommodating a document;
      a pickup roller having a rotary shaft, feeding said recording medium;
      an automatic document feeding roller connected to said pickup roller, rotating by the rotation of said pickup roller, feeding said document;
      a cover supporting and covering an assembly of said pickup roller and said automatic document feeding roller;

said paper feeding unit rotating about an axis of said rotary shaft, moving between a first position for said pickup roller to feed said recording media and a second position for said automatic document feeding roller to feed said document;

a feeding rubber contained in said paper feeding unit and positioned in contact with said automatic document feeding roller, and guiding said document fed by said automatic document feeding roller;

a contacting unit contained in said paper feeding unit and connected to said feeding rubber, separating said feeding rubber from said automatic document feeding roller in said first position and bringing said feeding rubber in contact with said automatic document feeding roller in said second position;

said contacting unit including a first locking unit fixed at said cover and a second locking unit fixed at said second cassette and connected to said first locking unit in said second position; and transporting rollers rotatably connected to and contained in said main body, transporting any one of either said recording medium fed by said pickup roller or said document fed by said automatic document feeding roller to the inside of said main body.

2. The automatic paper feeding device of claim 1, further comprised of said first and second locking units exhibiting a hook shape for locking in said first position and unlocking in said second position.

3. The automatic paper feeding device of claim 1, further comprised of a pivot connected between said feeding rubber said contacting unit, separating said rubber from said automatic document feeding roller in said first position while bringing said recording medium in contact with said pickup roller.

4. The automatic paper feeding device of claim 1, further comprised of a pivot connected between said feeding rubber and said contacting unit, maintaining said feeding rubber to be separated from said automatic document feeding roller in accordance with said contacting unit when said paper feeding unit is in said first position.

5. The automatic paper feeding device of claim 1, further comprised of both said pickup roller and said automatic document feeding roller rotating during said first and second position of said paper feeding unit.

6. The automatic paper feeding device of claim 5, further comprised of a pivot connected between said contacting unit and said feeding rubber, maintaining said feeding rubber to be separated from said automatic document feeding roller during locking position in said first position while bringing said recording medium in contact with said pickup roller.

7. An automatic paper feeding device in a multifunctional machine, comprising:

a recording medium cassette for containing a stack of recording media;

a document cassette for containing a document; and a paper feeding unit rotatably connected to a main body of said machine rotatably and movable between a first position and a second position, including:

an automatic document feeding roller and a feeding rubber for feeding said document in said second position to said main body;

a pickup roller having a shaft, rotating said automatic document feeding roller, and feeding said recording media in said first position to said main body;

said paper feeding unit rotating about an axis of said shaft of said pickup roller between said first position and said second position; and a contacting unit contained in said paper feeding unit, separating said feeding rubber from said automatic document feeding roller and bringing said recording medium in contact with said pickup roller when said paper feeding unit is in said first position for feeding said recording media, bringing said feeding rubber in contact with the automatic document feeding roller and separating said recording medium from said pickup roller when said paper feeding unit is in said second position for feeding said document.

8. The automatic paper feeding device of claim 7, further comprised of a pivot connected between said feeding rubber and said contacting unit.

9. The automatic paper feeding device of claim 7, further comprised of said connecting unit connected to a pivot, maintaining said pivot to separate said feeding rubber from said automatic document feeding roller in said first position.

10. The automatic paper feeding device of claim 7, further comprised of both said pickup roller and said automatic document feeding roller rotating in said first position and second position.

11. The automatic paper feeding device of claim 7, further comprised of a cover contained in said paper feeding unit, supporting and covering an assembly of said pickup roller and said automatic document feeding roller.

12. The automatic paper feeding device of claim 11, further comprised of said contacting unit including:

a first locking unit fixed at said cover; and a second locking unit fixed at said document cassette and connected to said first locking unit in said first position.

13. The automatic paper feeding device of claim 12, further comprised of said first and second locking units exhibiting a hook shape for locking in said first position of said paper feeding unit and unlocking in said second position of said paper feeding unit.

14. A method of feeding any one of either a document or a recording medium in a multifunctional machine, comprising the steps of:

providing a first cassette accommodating said recording medium;

providing a paper feeding unit containing a first roller having a shaft, a second roller driven by said first roller, a feeding rubber positioned in contact with said second roller, and a second cassette accommodating said document;

rotating said paper feeding unit about an axis of said shaft of said first roller between a first position and a second position;

allowing said paper feeding unit to separate said feeding rubber from said second roller and to bring said recording medium in contact with said first roller in said first position;

allowing said first roller to feed said recording medium from said first cassette to a main body of said multifunctional machine in said first position;

rotating said paper feeding unit to said second position;

allowing said paper feeding unit to bring said feeding rubber in contact with said second roller and to separate said recording medium from said first roller in said second position; and allowing said second roller to feed said document from said second cassette to said main body of said multifunctional machine in said second position.

15. The method of claim 14, comprised the step of rotating both said first roller and said second roller in both said first position and said second position.

* * * * *